United States Patent [19]

Hutchison

[11] 4,099,564

[45] Jul. 11, 1978

[54] LOW HEAT CONDUCTIVE FRANGIBLE CENTRALIZERS

[75] Inventor: Stanley O. Hutchison, Bakersfield, Calif.

[73] Assignee: Chevron Research Company, San Francisco, Calif.

[21] Appl. No.: 706,862

[22] Filed: Jul. 19, 1976

[51] Int. Cl.² .............................................. E21B 17/10
[52] U.S. Cl. ................................ 166/241; 260/37 R; 260/42.43
[58] Field of Search ......................... 260/37 R, 42.43; 166/241; 308/4 A

[56] References Cited

U.S. PATENT DOCUMENTS

| | | | |
|---|---|---|---|
| 329,968 | 11/1885 | Stopper | 166/242 |
| 459,826 | 9/1891 | Cook | 166/50 X |
| 1,552,888 | 9/1925 | Smith | 308/4 A |
| 1,814,271 | 7/1931 | Vaughn | 308/4 A |
| 2,153,787 | 4/1939 | Anderson | 308/4 A |
| 3,080,926 | 3/1963 | Remp, Jr. | 166/241 |
| 3,292,708 | 12/1966 | Mundt | 308/4 A |
| 3,487,043 | 12/1969 | Grudus | 260/37 R X |
| 3,613,783 | 10/1971 | Seabourn | 166/241 |
| 3,666,013 | 5/1972 | Saadeh | 166/241 |

OTHER PUBLICATIONS

Chemical Abstracts; vol. 81, #153683x; Kimio et al.; 1974.
Chemical Abstracts; vol. 79, #93148y; Roscher; 1973.
Lee et al.; Handbook of Epoxy Resins; McGraw-Hill Co.; 1967; pp. 14-2,3,4,5.

Primary Examiner—Ernest R. Purser
Assistant Examiner—William F. Pate, III
Attorney, Agent, or Firm—R. L. Freeland, Jr.; Edward J. Keeling

[57] ABSTRACT

Low heat conductive frangible centralizers are provided for use in a tubing string in a well and include a central tubular section connectable into the tubing string and having a plurality of radially extending polymerized furfuryl alcohol impregnated cordierite lugs in spaced apart position on the periphery of the tubular section with means to disconnectably connect such lugs on the tubular section.

8 Claims, 10 Drawing Figures

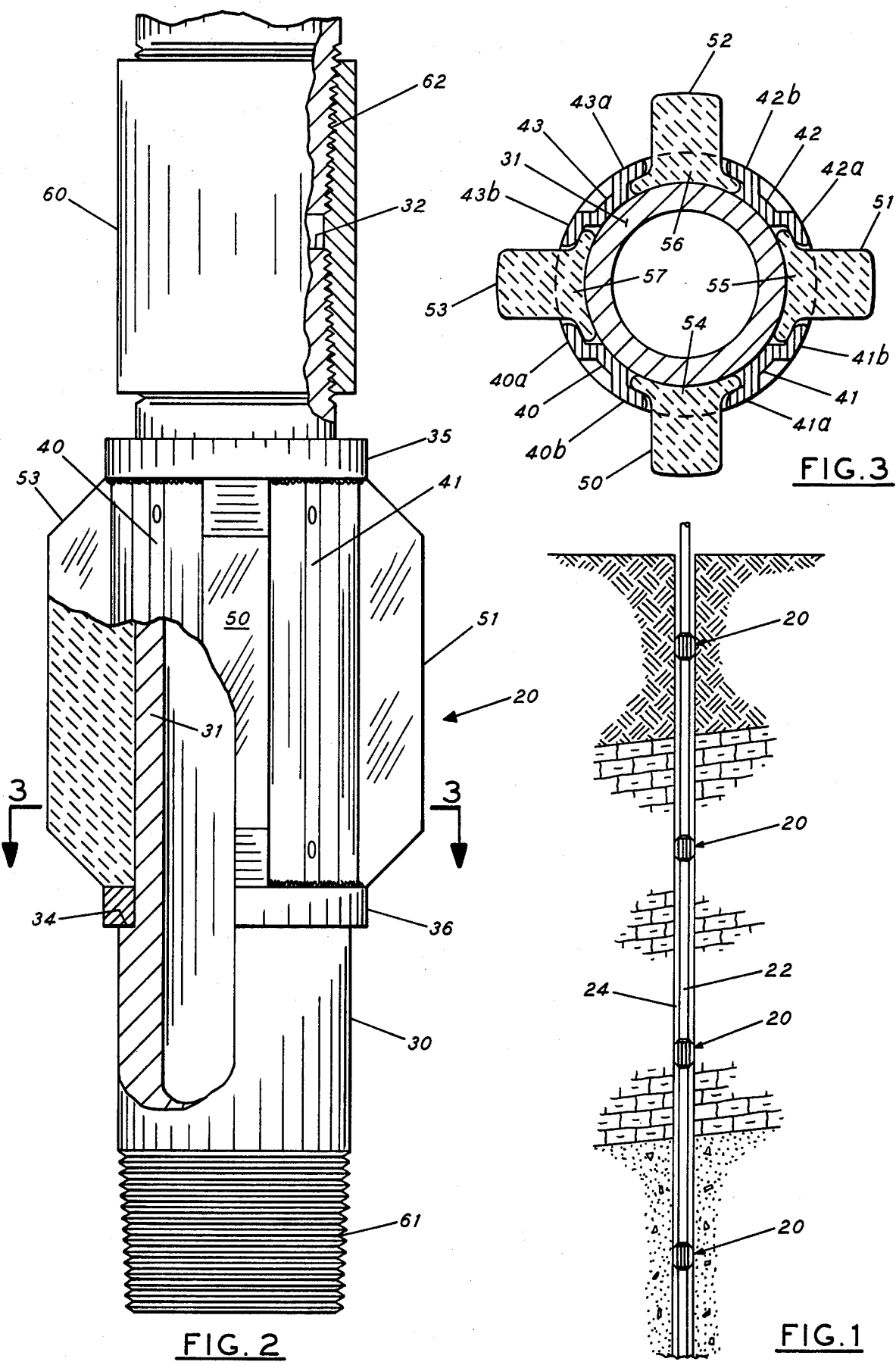

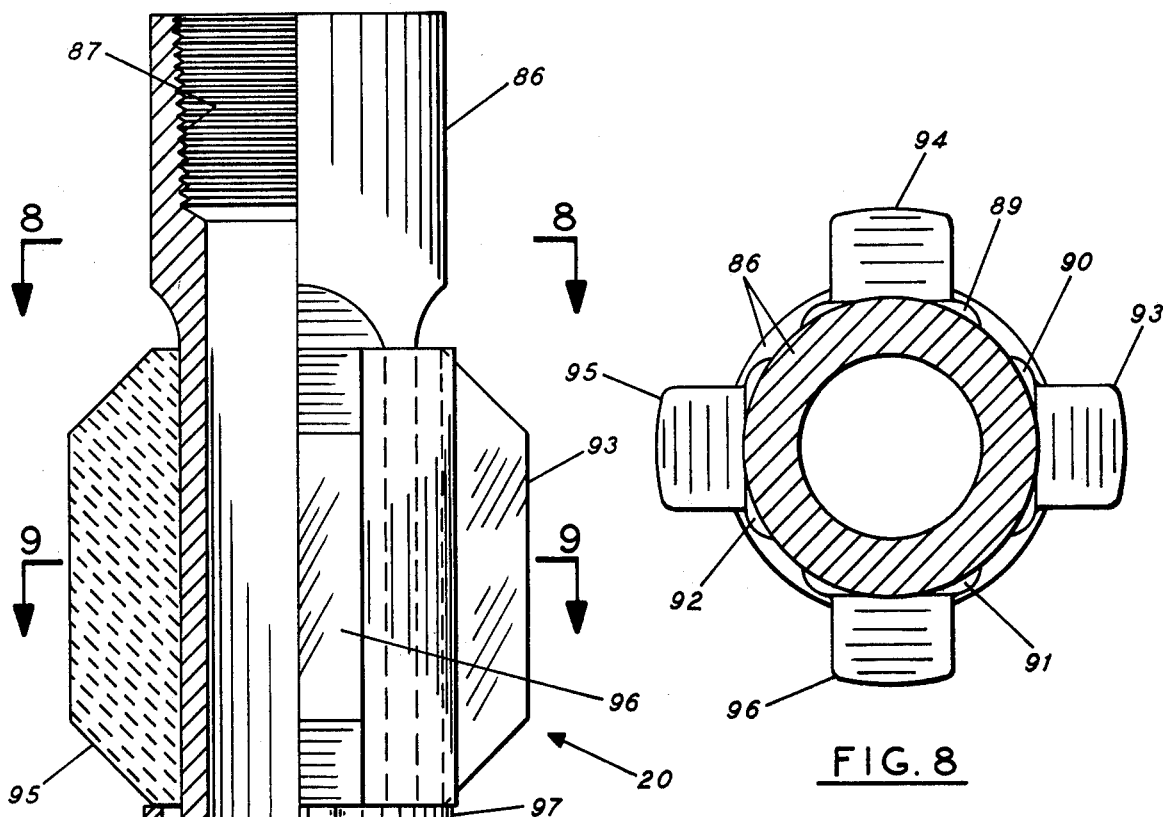
FIG. 7
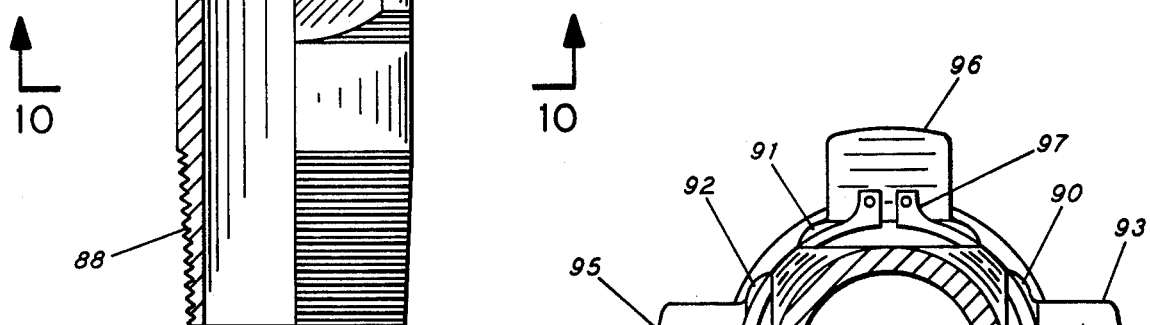
FIG. 8
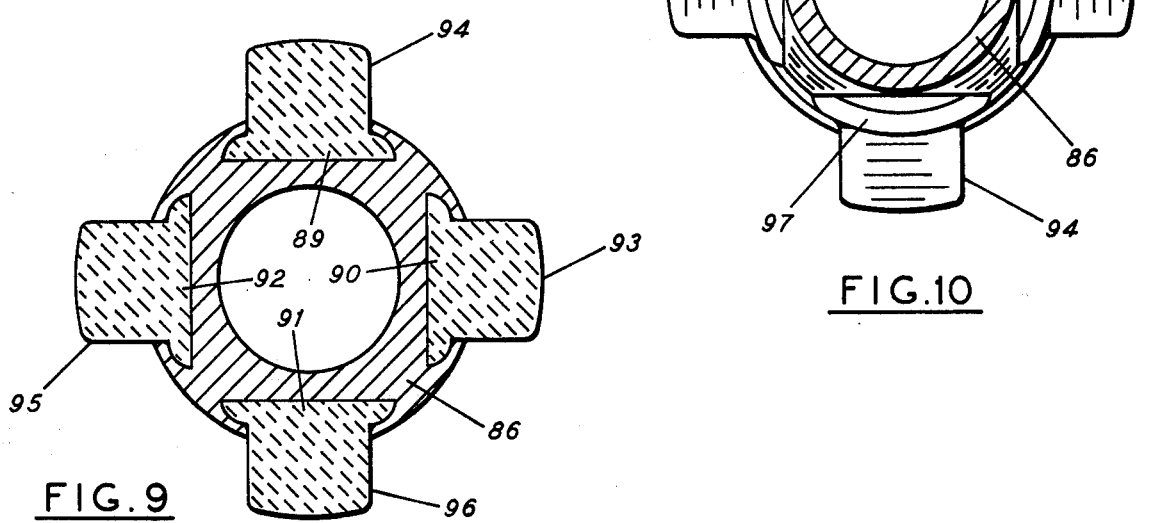
FIG. 9
FIG. 10

LOW HEAT CONDUCTIVE FRANGIBLE CENTRALIZERS

BACKGROUND OF THE INVENTION

This invention relates generally to devices known as centralizers for use in centering a string of tubing in a well. Heretofore it has been common practice to incorporate centralizers into a tubing string located in a well to insure that the tubing string does not contact the well wall or, if the well is cased, the casing. In many instances centralizers were used when it was desired to prevent heat loss or gain between the centralized tubing string and the well casing. Thus when steam or other hot fluid is injected into a formation it is desirable to prevent contact between the tubing string used for steam injection and the well casing to prevent excessive heat loss from the injection string. Similarly in permafrost areas it is desirable to prevent heat from a production or injection string from melting the permafrost. Heretofore metal centralizers have been used to overcome these problems. However, there has not been a completely satisfactory centralizer for such use due to the high heat conductance of the metal. Further, the prior art centralizers being made of metal are very difficult to remove by milling or washing over if the tubing string becomes stuck.

BRIEF DESCRIPTION OF THE PRESENT INVENTION

The present invention relates to centralizers having a special lug for separating a tubing string from the well casing or well wall to prevent heat transfer between the tubing and the well casing or wall. The low heat conductive frangible lugs of the centralizers of the present invention are also easily installed and removed for replacement. They also positively centralize the tubing since their compressive strength is much greater than the lateral load. If the tubing string becomes stuck, the frangible lugs of the present invention may be milled or washed over by convention well tools to assist in freeing the tubing string.

In a broad aspect the present invention provides a centralizer for use in a tubing string comprising a central tubular section connectable into the tubing string having a plurality of radially extending polymerized furfuryl alcohol impregnated cordierite lugs in spaced apart position on the periphery of the tubular section. Means are provided to disconnectably connect the lugs on the tubular section in this spaced apart position. Preferably, there are four spaced apart lugs on the tubing at 90° intervals.

In a more specific aspect a centralizer is provided for use in a tubing string comprising a central tubular section connectable into the tubing string and having a portion of reduced outer diameter extending from one end and forming an annular shoulder at the junction with the normal diameter portion of the tubular section intermediate the end of the tubular section. A cage section is slidably engaged over the reduced outer diameter portion of the tubular section for abutment against the annular shoulder. The cage section comprises a pair of annular collars maintained in fixed spaced apart position by a plurality of longitudinally extending spacer strips connected between the collars. Each of the spacer strips has flanged portions on the outer sides thereof. A plurality of polymerized furfuryl alcohol impregnated cordierite lugs having an enlarged base portion are engaged under opposing flanged portions of adjacent spacer strips. A removable collar is connected on the end of the reduced diameter portion of the tubular member to disconnectably connect the lugs on the tubular section.

In still another aspect the present invention provides a centralizer for use in a tubing string comprising a central tubular section connectable into a tubing string and a longitudinally split cage section engageable around the tubular section. The cage section comprises a pair of slit annular collars maintained in fixed spaced apart position by a plurality of longitudinally extending spacer strips connected between the collars. Each of said spacer strips has flanged portions on the outer sides thereof. A plurality of polymerized furfuryl alcohol impregnated cordierite lugs, each having an enlarged base portion are engaged under opposing flanged portions of adjacent spacer strips. Snap rings are connected over each of the split annular collars to disconnectably connect the annular collars and the lugs on the tubular section.

In still another aspect the invention provides a centralizer for use in a tubing string comprising a central tubular section connectable into a tubing string and having a plurality of undercut longitudinally extending grooves in it. A plurality of radially extending polymerized furfuryl alcohol impregnated cordierite lugs having an enlarged base portion are slidably engaged in the grooves of the tubular member. Means are provided to disconnectably connect the lugs in the grooves.

OBJECT OF THE INVENTION

A principal object of the present invention is to provide a low heat conductive frangible centralizer for use in centralizing well tubing in a well. Further objects and advantages of the invention will be apparent when the detail description thereof is read in view of the accompanying drawings which are made part of the specification.

BRIEF DESCRIPTION OF THE DRAWINGS

FIG. 1 is an elevation view partially in section and schemtically illustrates centralizers assembled in accordance with the invention positioned on a tubing string located in a well;

FIG. 2 is an elevation view with portions broken away for clarity of presentation and illustrates the preferred centralizers assembled in accordance with the present invention;

FIG. 3 is a sectional view taken at line 3—3 of FIG. 2;

FIG. 7 is an elevation view with portions broken away for clarity of presentation and illustrates another alternative centralizer assembled in accordance with the present invention;

FIG. 8 is a sectional view taken at line 8—8 of FIG. 7;

FIG. 9 is a sectional view taken at line 9—9 of FIG. 7; and

FIG. 10 is a sectional view taken at line 10—10 of FIG. 7.

DESCRIPTION OF THE PREFERRED EMBODIMENT

Figures 4, 5, 6:
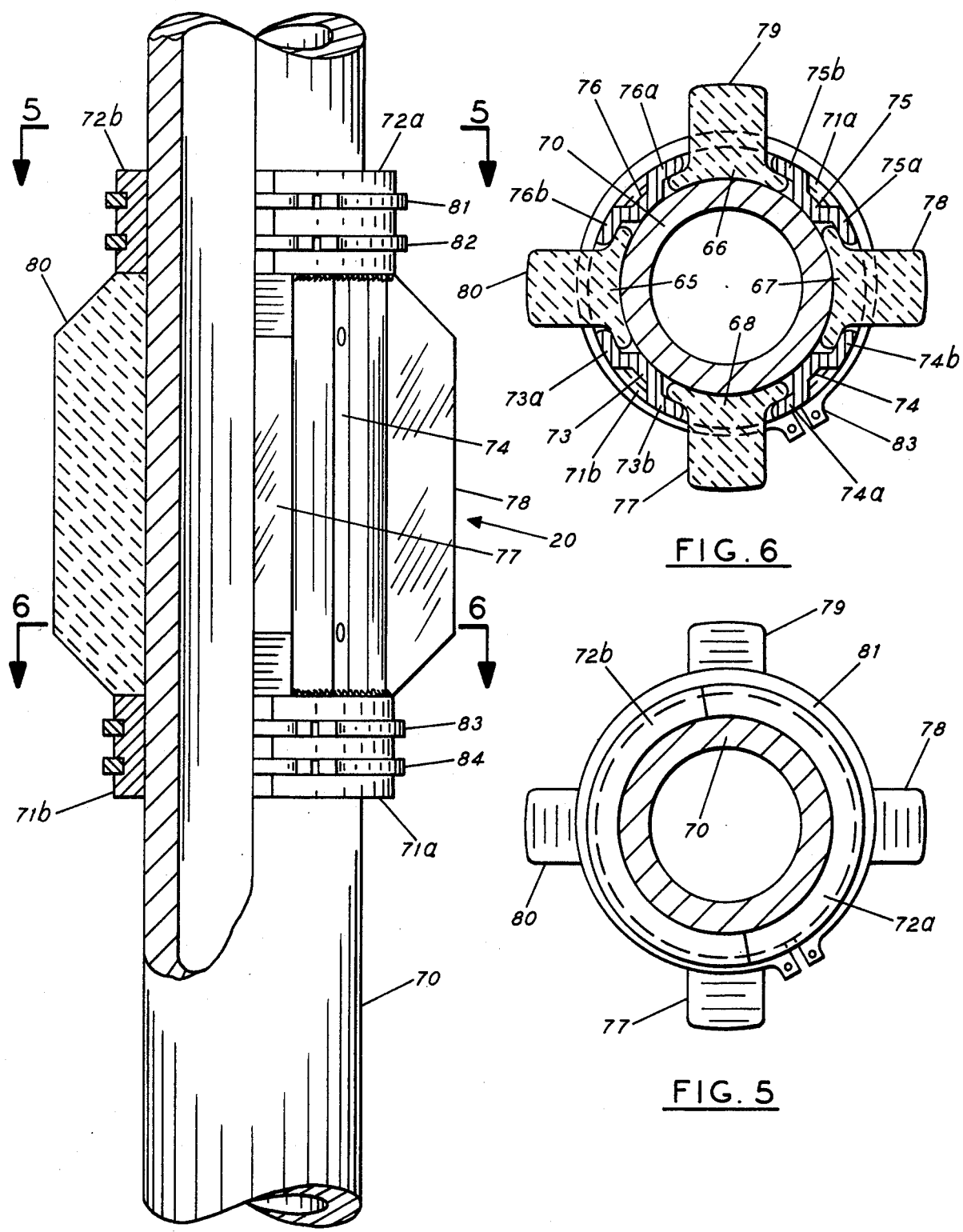
FIG. 4 is an elevation view with portions broken away for clarity of presentation and illustrates an alternative centralizer assembled in accordance with the present invention.
FIG. 5 is a sectional view taken at line 5—5 of FIG. 4.
FIG. 6 is a sectional view taken at line 6—6 of FIG. 4.

FIG. 1 is a schematic elevation view of a well penetrating the earth illustrating centralizers indicated generally by the numeral 20 assembled in accordance with the present invention. The centralizers 20 are spaced apart on a tubing string 22 to center the tubing string in the interior of a well. In accord with the usual practice, the well is normally lined with a casing string 24. The centralizers may, of course, be used in an uncased well or an open hole. The centralizers of the present invention are particularly useful to prevent heat transfer between the tubing string 22 and the casing string 24. Further, if the tubing string becomes stuck in the hole, the centralizer lugs may be readily broken by convention well practice to facilitate removal of the tubing string 22 from the well.

FIGS. 2 and 3 illustrate the preferred centralizer assembled in accordance with the present invention. A central tubular section 30 is provided with a portion 31 of reduced outer diameter extending from one end 32. The reduced diameter portion forms an annular shoulder 34 at the junction with the normal diameter portion of the tubular member 30. A cage section is slidably engageable over the reduced diameter portion 31 of the tubular section 30. The cage section comprises a pair of annular collars 35, 36, maintained in fixed spaced apart position by a plurality of longitudinally extending spacer strips 40, 41, 42, 43. The spacer strips are welded or otherwise suitably fixedly connected to the annular collars. The spacer strips have flanged portions 40a, 40b, 41a, 41b, etc., on the outer sides thereof. A plurality of lugs 50, 51, 52, 53 having enlarged base portions 54, 55, 56, 57, engaged under opposing flanged portions of adjacent spacer strips are positioned around the periphery of the central tubular section. A removable collar 60 is connected on the end of the reduced diameter portion of the tubular member to disconnectably connect the lugs on the central tubular section. The central tubular section is connected into a tubing string by means of male threads 61 at one end and female threads 62 in collar 60 at the other end.

The lugs 50 are formed from polymerized furfuryl alcohol impregnated cordierite. Cordierite is a mixture of dry clays mixed to a dough-like consistency with 20 t 30% by volume water, extruded or molded to the proper shape, room dried to remove excessive water and fired in a kiln at 2400° F for 24 hours. The lugs are then put into a pan containing furfuryl alcohol containing a suitable catalyst in vacuum to remove air from the lugs to insure complete impregnation of the furfuryl into the lug. The lugs are removed from the pan to drain excess furfuryl. The lugs are put into an oven and the temperature is maintained at 160° F to polymerize the furfuryl alcohol in about 40 minutes. A suitable furfuryl alcohol-catalyst system is described in U.S. Pat. No. 3,850,249, issued Nov. 26, 1974, to Patrick H. Hess and assigned to Chevron Research Company of San Francisco, Calif. The disclosure of U.S. Pat. No. 3,850,249 is hereby incorporated by reference.

Various materials were tested in a search to discover a suitable material for use in the present invention. A small pressure vessel was installed on a steam injection well, where material samples were placed and steam flowed over them under actual well conditions.

The following materials were tested at 450° to 475° F temperature and 575 to 650 psi pressure:

Cordierite
Pyrex
Furfuryl alcohol
Various fiberglass compounds
Various polylite compounds
Various polyester compounds
Polyethylene molding material
Casting resins
Styrene and asbestos mixtures Cordierite, pyrex, and furfuryl alcohol resins were the only materials that were competent after being in this environment for seven days. The cordierite surface tended to soften up when in wet steam which resulted in poor wear characteristics. However, if the cordierite were filled with polymerized furfuryl alcohol, the wear characteristics and compessive strength were improved. Subsequent test with pyrex indicated that it fractured easily and was very expensive to get in specialty sizes. It has not been possible to cast pure furfuryl alcohol resins without gas bubbles which lowered the compressive strength to an unacceptable level.

A typical chemical analysis of cordierite after being fired is:

| | |
|---|---|
| $SiO_2$ | 51.4% |
| $AL_2O_3$ | 13.7 |
| $MgO$ | 30.0 |
| Others | 1.5 |
| | 100.0% |

The following are the strength and thermal properties of cordierite and other materials:

| | |
|---|---|
| Compressive Strength | |
| Unfilled cordierite | 2,575 to 7,830 psi |
| Furfuryl filled cordierite | 14,000 to 18,300 psi |
| Concrete | 2,500 psi |
| Structural steel | 60,000 psi |
| Thermal Conductivity (BTU-in/hr-ft/° F) | |
| Unfilled cordierite | 6.4 |
| Furfuryl filled cordierite | 6.0 |
| Air | 0.163 |
| Cork board | 0.3 |
| Steel | 300.0 |
| Copper, pure | 2,616.0 |

FIELD TESTS

Five complete centralizer assemblies were fabricated and ran to 640 in a well and then pulled. The assemblies had two unfilled and two polymerized furfuryl alcohol filled cordierite centralizers. The unfilled centralizers wore down 3/16 inch whereas the filled cordierite centralizers wore only 1/16 inch. The tubing string was then run back in and a regular steam cycle performed without a packer in the casing. After cooling, the tubing was pulled and the centralizers were found to be in excellent condition.

Centralizer assemblies utilizing polymerized furfuryl alcohol impregnated lugs were run in two wells in the Kern River Field, and the casing-tubing annulus was filled with Sodium Silicate insulation. These wells have not yet been pulled so the centralizer assemblies condition cannot be ascertained.

Twenty centralizer assemblies utilizing polymerized furfuryl alcohol impregnated lugs were run in the interval 2897' to 1917' in a well in Santa Maria, California. This tubing string had a packer. After a regular cyclic steam stimulation job, the string was pulled and the furfuryl filled cordierite centralizers were found to be in good condition with only the bottom corner of two centralizers' lugs broken off.

DESCRIPTION OF ALTERNATIVE EMBODIMENTS

An alternative embodiment of the invention is illustrated in FIG. 4, FIG. 5 and FIG. 6. FIG. 4 is an elevation view with portions broken away for card view position and FIGS. 5 and 6 are sectional views taken at line 5—5 and line 6—6, respectively, of FIG. 4. A central tubular section 70 is shown and is connectable into a tubing string. Thus, the central tubular section 70 may be a sub for connection into a tubing string or alternatively may be a section of the tubing string itself. A centralizer indicated by the numeral 20 is shown connected on the central tubular section. A longitudinally split cage section is engaged around the tubular section 70. The cage section comprises a pair of split annular collars 71a, 71b and 72a, 72b maintained in fixed spaced apart position by a plurality of longitudinally extending spacer strips 73, 74, 75 and 76. The spacer strips are welded or otherwise fixedly connected to the annular rings. Each of the spacer strips 73, 74, 75 and 76 have flange portions 73a, 73b; 74a, etc. on the outer sides thereof. A plurality of polymerized furfuryl alcohol impregnated cordierite lugs 77, 78, 79 and 80 are engaged under opposing flanged portions of adjacent spacer strips. The lugs have enlarged base portions adapted for such engagement. Snap rings 81, 82, 83 and 84 engage in suitable grooves in the split annular collars to disconnectably connect the annular collars and the lugs on the tubular section.

Another alternative embodiment assembled in accordance with the present invention is illustrated in FIGS. 7-10. FIG. 7 is an elevation view with portions broken away for clarity of position and FIGS. 8-10 are sectional views taken from FIG. 7. A central tubular section 86 is provided with suitable threads 87 and 88 for connection into a tubing string. The central tubular section contains a plurality of undercut longitudinally extending grooves 89, 90, 91 and 92 as best illustrated in FIG. 9. Each of the grooves are adapted to receive the enlarged base portion of a polymerized furfuryl alcohol cordierite lug. Thus lug 93 is engaged in groove 90; lug 94 is engaged in groove 89; lug 95 is engaged in groove 92; and lug 96 is engaged in groove 91. The lugs butt against the termination of their respective grooves and are held in such position by a snap ring 97 which engages in a suitable groove formed at the open end of the longitudinally extending groove in tubular section 86.

Although certain specific embodiments have been described in detail herein, the invention is not limited only to those embodiments but rather by the scope of the appended claims.

What is claimed is:

1. A centralizer for use in a tubing string comprising a central tubular section connectable into a tubing string, a plurality of radially extending polymerized frangible furfuryl alcohol impregnated prefired cordierite lugs in spaced apart position on the periphery of said tubular section for positively centralizing said tubular section, and means disconnectably connecting said lugs on said tubular section in said spaced apart position.

2. The centralizer of claim 1 further characterized in that there are four spaced apart lugs on said tubing at 90° intervals.

3. A centralizer for use in a tubing string comprising a central tubular section connectable into a tubing string and having a portion of reduced outer diameter extending from one end and forming an annular shoulder at the junction with the normal diameter portion of said tubular section intermediate the end of said tubular section, a cage section slidably engageable over said reduced outer diameter portion of said tubular section for abutment against said annular shoulder, said cage section comprising a pair of annular collars maintained in fixed spaced apart position by a plurality of longitudinally extending spacer strips connected between said collars, each of said spacer strips having flanged portions on the outer sides thereof, a plurality of furfuryl alcohol impregnated prefired cordierite lugs, each of said lugs having an enlarged base portion engaged under opposing flanged portions of adjacent spacer strips and a removal collar connected on the end of the reduced diameter portion of said tubular member to disconnectably connect said lugs on said tubular section.

4. The centralizer of claim 3 further characterized in that there are four spaced apart lugs on said tubing at 90° intervals.

5. A centralizer for use in a tubing string comprising a central tubular section connectable into a tubing string; a longitudinally split cage section engageable around said tubular section, said cage section comprising a pair of split annular collars maintained in fixed spaced apart position by a plurality of longitudinally extending spacer strips connected between said collars, each of said spacer strips having flanged portions on the outer sides thereof, a plurality of furfuryl alcohol impregnated prefired cordierite lugs, each of said lugs having an enlarged base portion engaged under opposing flanged portions of adjacent spacer strips and snap rings engaging each of said split annular collars to disconnectably connect said annular collars and said lugs on sia dtubular section.

6. The centralizer of claim 5 further characterized in that there are four spaced apart lugs on said tubing at 90° intervals.

7. A centralizer for use in a tubing string comprising a central tubular section connectable into a tubing string, a plurality of undercut longitudinally extending grooves in said tubular section, a plurality of radially extending furfuryl alcohol impregnated prefired cordierite lugs having an enlarged base portion slidably engaged in said grooves of said tubular member, and means disconnectably connecting said lugs in said grooves.

8. The centralizer of claim 7 further characterized in that there are four spaced apart lugs on said tubing at 90° C intervals.

* * * * *

UNITED STATES PATENT AND TRADEMARK OFFICE
CERTIFICATE OF CORRECTION

PATENT NO. : 4,099,564
DATED : July 11, 1978
INVENTOR(S) : STANLEY O. HUTCHISON

It is certified that error appears in the above-identified patent and that said Letters Patent are hereby corrected as shown below:

Col. 4, line 27, (in the table) "13.7" should read --13.1--;
"    "    "   28,    "   "   "   "30.0" should read --34.0--.

Claim 5, col. 6, line 45, should read --said tubular-- instead of "sia dtubular";
Claim 8, col. 6, line 60 "90°C" should read --90°--.

Signed and Sealed this

Tenth Day of April 1979

[SEAL]

Attest:

RUTH C. MASON
Attesting Officer

DONALD W. BANNER
Commissioner of Patents and Trademarks